United States Patent [19]

Welsh et al.

[11] Patent Number: 4,738,243

[45] Date of Patent: Apr. 19, 1988

[54] HOOD SYSTEM FOR CONVEYORIZED COOKING OVEN

[75] Inventors: Clarke T. Welsh, Logansport; Russell L. Breidinger, Rochester, both of Ind.

[73] Assignee: LDI Mfg. Co., Inc., Logansport, Ind.

[21] Appl. No.: 2,768

[22] Filed: Jan. 12, 1987

[51] Int. Cl.$^4$ ............................................. A47J 37/06
[52] U.S. Cl. .............................. 126/299 R; 99/443 C
[58] Field of Search .................. 98/115.1; 99/443 C; 126/1 E, 41 C, 299 R, 299 D

[56] References Cited

U.S. PATENT DOCUMENTS

| | | | |
|---|---|---|---|
| 2,060,398 | 11/1936 | Lenke | 126/299 R |
| 2,167,047 | 7/1939 | Jackson et al. | 126/299 R X |
| 2,577,150 | 12/1951 | Pledger | 126/299 R |
| 3,233,606 | 2/1966 | Turner et al. | 126/299 R X |
| 4,176,589 | 12/1979 | Stuck | 99/443 C X |
| 4,252,055 | 2/1981 | Johansson et al. | 126/41 C X |
| 4,473,004 | 9/1984 | Wells et al. | 99/443 C X |
| 4,616,562 | 10/1986 | Kuechler | 126/299 R X |

FOREIGN PATENT DOCUMENTS 112615 12/1944 Sweden .......................... 126/299 D Primary Examiner—Harold Joyce
Attorney, Agent, or Firm—Woodard, Emhardt, Naughton, Moriarty & McNett

[57] ABSTRACT

A kitchen exhaust hood covers the top of an oven and food conveyors which extend on both sides of the oven. Plates in the hood cooperate with the walls of the hood to provide slots at the hood front and sides to accelerate the air under the plates adjacent the slots and provide high velocity exhaust air flow upward in the hood at the front and sides of the hood to capture heat and fumes. The plates are located slightly above the lower edge of the hood, to minimize induction of room air horizontally into the hood under the edge, and assure collection of air that has been associated with the oven and has accumulated heat or collected contaminants. Air flow guides at ends of a conveyor direct heat and fumes around the ends of the conveyor toward the conveyor covering hood portions.

25 Claims, 4 Drawing Sheets

HOOD SYSTEM FOR CONVEYORIZED COOKING OVEN

BACKGROUND OF THE INVENTION

This invention relates generally to ventilating systems, and more particularly to a ventilating system for removal of heat and fumes from the vicinity of a conveyorized cooking oven. Some restaurant kitchens, particularly for so-called fast food restaurants, have cooking equipment designed particularly for the type of restaurant that it is and cooking that is to be done. There is a significant market for factory-built cooking equipment which can be installed as a complete unit in a restaurant kitchen or the like. Examples are conveyorized ovens which are suitable for a variety of products including, for example, pizzas. While such ovens may be well designed and well insulated, they are capable of dissipating much heat to the room in which they are located. Also, depending upon the foods being cooked in them, such ovens may introduce objectionable fumes and odors into the room. If the room is sufficiently large and well ventilated, these conditions may not be too objectionable. However, as cooking capacities are increased, and room sizes for kitchens become smaller, it can be very objectionable. The present invention is directed to removal of excess heat, fumes and odors from the vicinity of conveyorized cooking ovens.

SUMMARY OF THE INVENTION

Described briefly, according to a typical embodiment of the present invention, a hood assembly includes a hood with a central header portion employed to cover the top of an oven. The hood has overhang portions at opposite ends of the central portion and which extend on both sides of the oven over the conveyors. The central portion and the overhang portions of the hood have plates therein cooperating with the walls of the hood to provide slots at the front and sides to provide high velocity air flow upward in the hood at the front and sides of the hood. This provides low pressure regions adjacent the slots to capture heat and fumes. The slots are sheltered from the room environment to some extent by having the plates located slightly above the lower edge of the hood, to minimize induction of room air horizontally into the hood under the edge, and assure collection of air that has been associated with the oven and has accumulated heat or collected contaminants. Provision is made for filtering when and if needed. Guides are provided on the conveyor supports to direct heat and fumes around the ends thereof, toward the hood overhang portions.

DESCRIPTION OF THE PREFERRED EMBODIMENT

Figure 1:
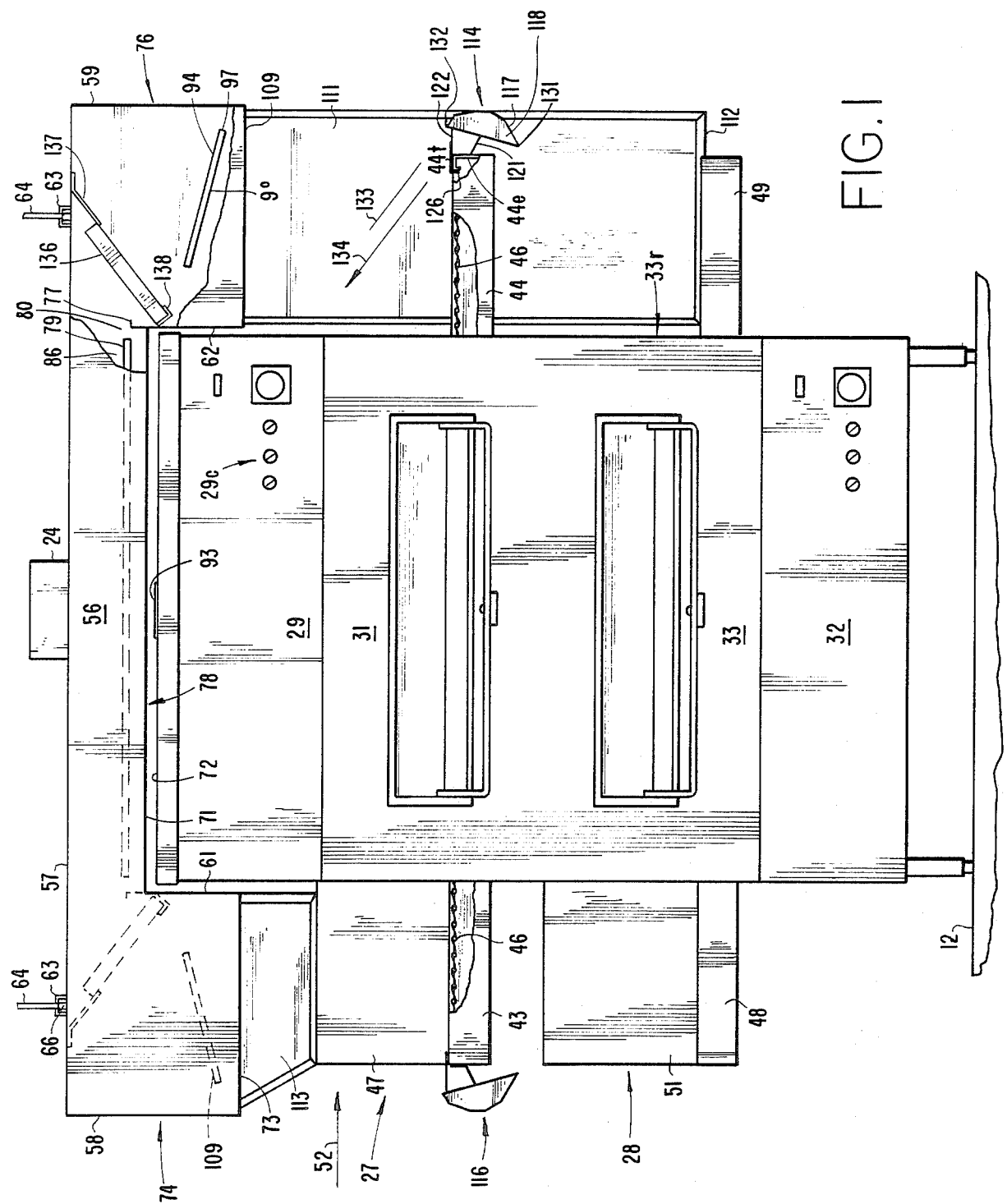
FIG. 1 is a front elevational view of a double oven and hood assembly installation according to a typical embodiment of the present invention.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
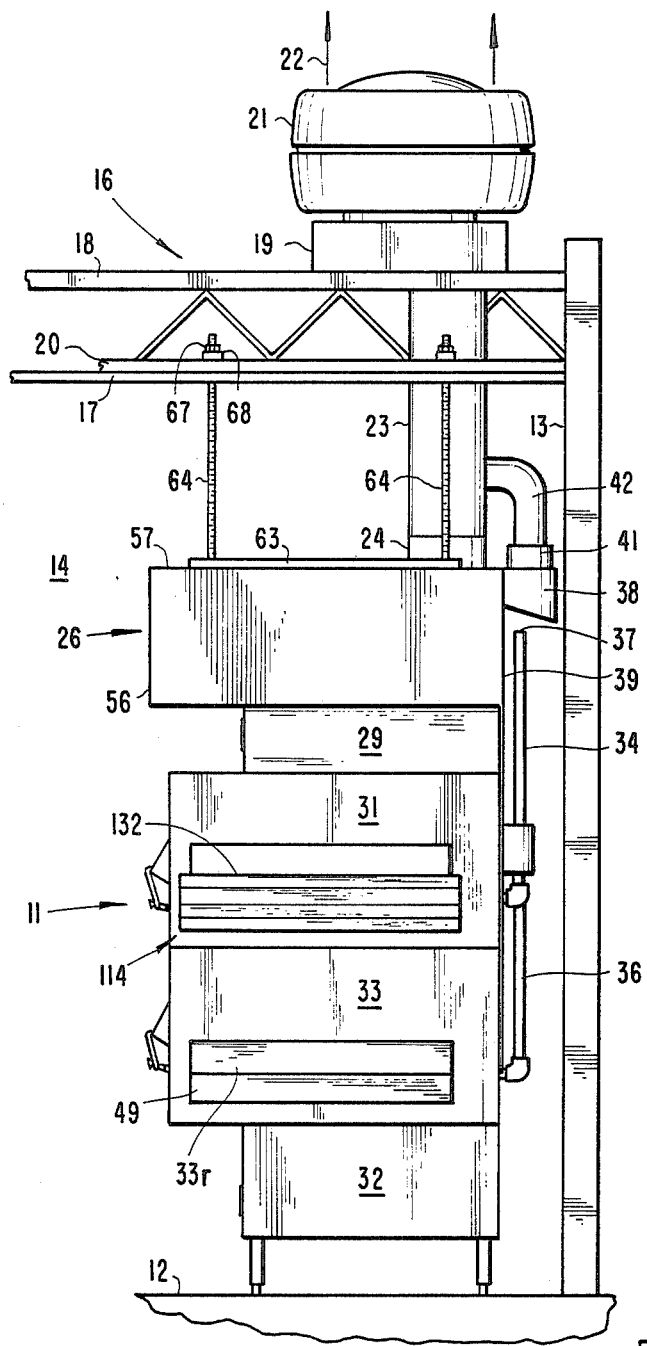
FIG. 2 is a side elevational view thereof on a smaller scale and also showing the complete installation in a building room.

Referring now to the drawings in detail, and particularly FIGS. 1 and 2, the oven assembly 11 is shown sitting on the floor 12 in front of the wall 13 of the room 14 in building 16. The ceiling is at 17 under roof 18 supporting a roof curb 19 under the exhaust blower 21. The illustrated blower exhausts air upward in direction of arrows 22. The exhaust blower intake is connected to a conduit 23 which may be referred to either as an exhaust "drop" or exhaust "stack" which is connected to an exhaust collar 24 at the top of a hood assembly 26 built and located according to a typical embodiment of the present invention.

In the illustrated example, the oven shown is a double oven of the type known as the Pacesetter 360 Middleby Marshall of Morton Grove, Ill. It is a double oven including an upper unit 27 and lower unit 28 which are largely identical except that the control cabinet 29 for the baking chamber 31 of unit 27 is on top of the baking chamber, whereas the control cabinet 32 for the baking chamber 33 of the lower unit 28 is under the baking chamber. These are sold in the gas fired or electrically heated type. The gas fired version is shown herein with the combustion product exhaust pipe 34 for the upper unit at the back (FIG. 2) beside the exhaust pipe 36 for the lower unit, both of which extend upward to the level of the upper end outlet 37 under an exhaust collector bonnet 38 mounted to the back wall 39 of the hood assembly. The bonnet outlet 41 is connected through the pipe fittings 42 into the back of the exhaust drop 23 from which the combustion products are taken outside the building through blower 21.

Each of the oven units includes an endless chain conveyor for moving food through the baking chamber. The conveyor on each unit extends laterally from both sides of the unit. For example, for unit 27, the conveyor assembly includes conveyor supports 43 and 44 projecting outward from the sides of the oven. The upper flight 46 of the conveyor chain is shown schematically at both sides of the baking chamber. The conveyor chain drive system is located in a housing 47 at the back of the conveyor support 43 and projecting upward therefrom. Similarly, for oven unit 28, conveyor supports 48 and 49 project from the left and right hand sides, respectively, of the baking chamber 33, and the drive system for the conveyor chain therein is located in the housing 51 at the back of conveyor support 48. These ovens are typically equipped so that the conveyor drive is capable of driving the conveyor in either direction so that the upper flight can move from the left to the right in the direction of arrow 52 or in the opposite direction, and at various speeds, as desired. Controls for direction, speed, oven temperature and other determinable variables are provided on the front panel of the control compartment such as at 29C on the front of control compartment 29 for the upper oven unit 27. The portions of these control compartments which house the control components are typically provided with their own ventilating fans to take in room air and cool the components, thereby minimizing any possible detrimental impact of heat from the baking chamber. However, for a single oven which is about 54 inches wide, 45 inches deep (front to rear) and 90 inches overall width from end to end of the conveyor supports, the input rating for the gas fired version is about 135,000 BTU per hour. Therefore, although the fan in the control compartment may provide adequate cooling for the control components themselves, there is a very large dissipation of heat into the room surrounding the oven, in the absence of the present invention.

Referring further to the hood assembly 26 employed according to a typical embodiment of the present invention, it includes the front wall or face 56, top 57, back 39, and left and right side or end walls 58 and 59, respectively. It also includes intermediate walls 61 and 62. For use with an oven as described above, the overall width from the end 58 to end 59 may be 100 inches, and the overall depth from front wall or face 56 to back wall 39 may be 45 inches, for example. All of these compartments are typically made of stainless steel and welded together and provide a hood which is open at the bottom, and closed at the top except for the 10 inch by 10 inch exhaust collar 24 located centrally at the rear of the top 57. Channel members 63 are fastened to the top 57 and receive the lower ends of hanger rods 64 having nuts 66 threaded and secured thereon and which are received in the channels 63. The rods may be hung to the ceiling or roof support structure in any suitable way, whereby the hood assembly is properly located with respect to the top of the oven assembly. In the illustrated example, the hanger rods 64 are supported by nuts 67 on rails 68 on the ceiling support structure 20.

Referring further to the hood itself, the lower edge 71 of the front face 56 of the hood between the intermediate walls 61 and 62 is at a level about one inch above the level of the top 72 of the upper oven control compartment 29. However, the portions of the hood face outboard of the intermediate walls 62 extend from this level downward to a level about 74 inches above the floor 10. Accordingly, the lower edges of the hood around the two side drops 74 and 76 are about 11 inches below the oven control compartment top 72. This includes the intermediate walls 61 and 62. However, in contrast to the front, rear and side walls, the intermediate walls extend up only to their flanged top margins 77 which are about six inches below the top 57 and about one and one-half inches above the lower edge 71 of the central portion of the front wall.

The bottom opening 78 of the hood which is framed by the central portions of the front and rear wall and by the upper portions of the intermediate walls 61 and 62, has a barrier 79 closing most of it. This barrier is actually a stainless steel plate which is flat and rectangular, having upturned flanges at all four sides for stiffness, creating an extremely shallow pan. It may be attached to the center back wall 39 of the hood by means of hinge tabs 81 welded to the back wall and projecting upward through apertures such as 82 in the barrier plate. The upturned flange at the front margin 83 is parallel to and spaced behind the center portion of the hood face such as to provide a typically two inch wide slot 84 providing communication from the space under the hood above the oven, to the space 86 (FIG. 1) between the top of the plate and the top 57 of the hood. The side margins 87 of the central barrier plate 79 are parallel to and spaced from the upper portions of walls 61 and 62 such as to provide a one inch wide slot 88 and 89 at each side of the opening 78. The back margin 91 of the plate 79 is virtually in contact with the inside face of the back wall 39 of the hood. So the combination of plate 79 with the front and intermediate walls, provides a generally U-shaped slot for communication between the space above the oven assembly and the space 86 above the plate 79. In addition, there is a central aperture 92, typically about 8 inches in diameter and which is located above the central circular air vent outlet 93 in the top 72 of the oven control compartment 29. Heat being discharged from outlet 93 by the cooling fan (not shown) in the oven control compartment can pass directly through plate aperture 92 to the hood space 86, from which it exits through the exhaust air collar 24.

Figure 3:
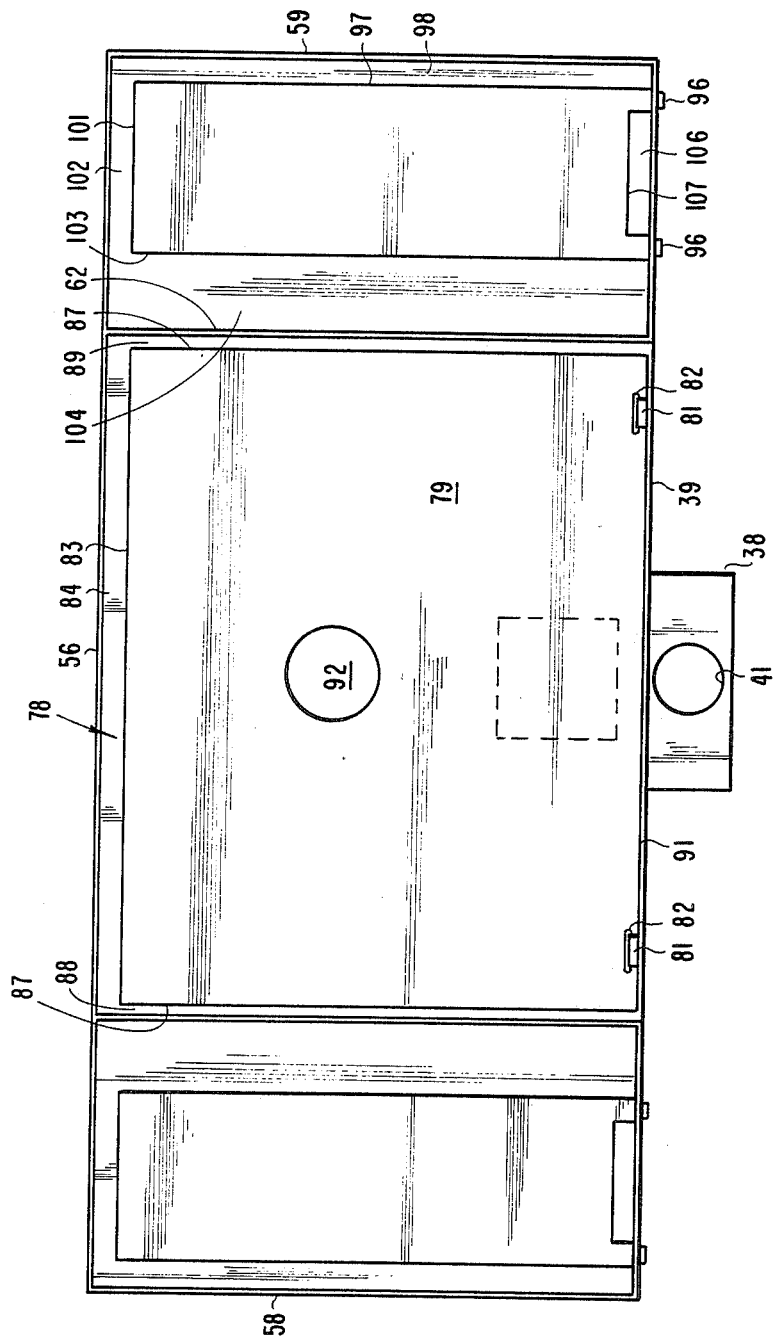
FIG. 3 is a bottom plan view of the hood itself.

Each of the hood side drops is identical to the other. Therefore, a description of the right side drop 76 is applicable, as well, to left side drop 74. There is a flow directing barrier plate 94 which, like plate 79, has an upturned flange around it, for stiffness. This plate may have two downturned tabs 96 (FIG. 3) extending through slots in the back wall 39 of the hood and whereby the plate is hinged at the back. Alternatively, it can be mounted at the back like plate 79. The side margin 97 is spaced from end wall 59 about two inches to provide a two inch slot 98 at the outboard edge of the hood. The front margin 101 is spaced from the front wall 56 about two inches to likewise provide a two inch slot 102 at the front. The inner margin 103 is parallel to and spaced from the intermediate wall 62 about five and three-quarter inches, thereby providing a slot of that width at 104. This plate is inclined up from horizontal toward the intermediate wall 62 at an angle of about 9°. A two inch slot 106 is provided between the rear margin thereof at 107 and the rear wall 39 between the mounting tabs at the rear. The front of this plate is supported by a couple of hanger straps which are fastened to the top of the plate and to the top 57 of the hood.

The construction described for the flow directing barrier plate 94 in the hood side drop 76 is used identically in the side drop 74 except, of course, the barrier plate 109 in that side drop is inclined upwardly and inwardly toward the intermediate wall 61. It is preferable that the lower outer margin for the side drop barriers such as margin 97 for barrier 94 be located above the lower edge 109 of the side drop.

A long end curtain 111 extends down from the back wall 39 of the hood behind the conveyor support 44 and conveyor support 49, the bottom of this end curtain being just below the top of the lower conveyor. This keeps heat and any fumes away from the wall behind the conveyors. On the other side of the oven assembly, a short end curtain 113 extends down from the back wall 39 of the hood to the top of the upper conveyor drive mechanism housing 47. This wall and the housing cooperate to keep heat and fumes away from the building wall behind this conveyor. Similarly, the conveyor drive housing 51 keeps heat and fumes away from the building wall behind this lower conveyor and drive housing.

Figure 4:
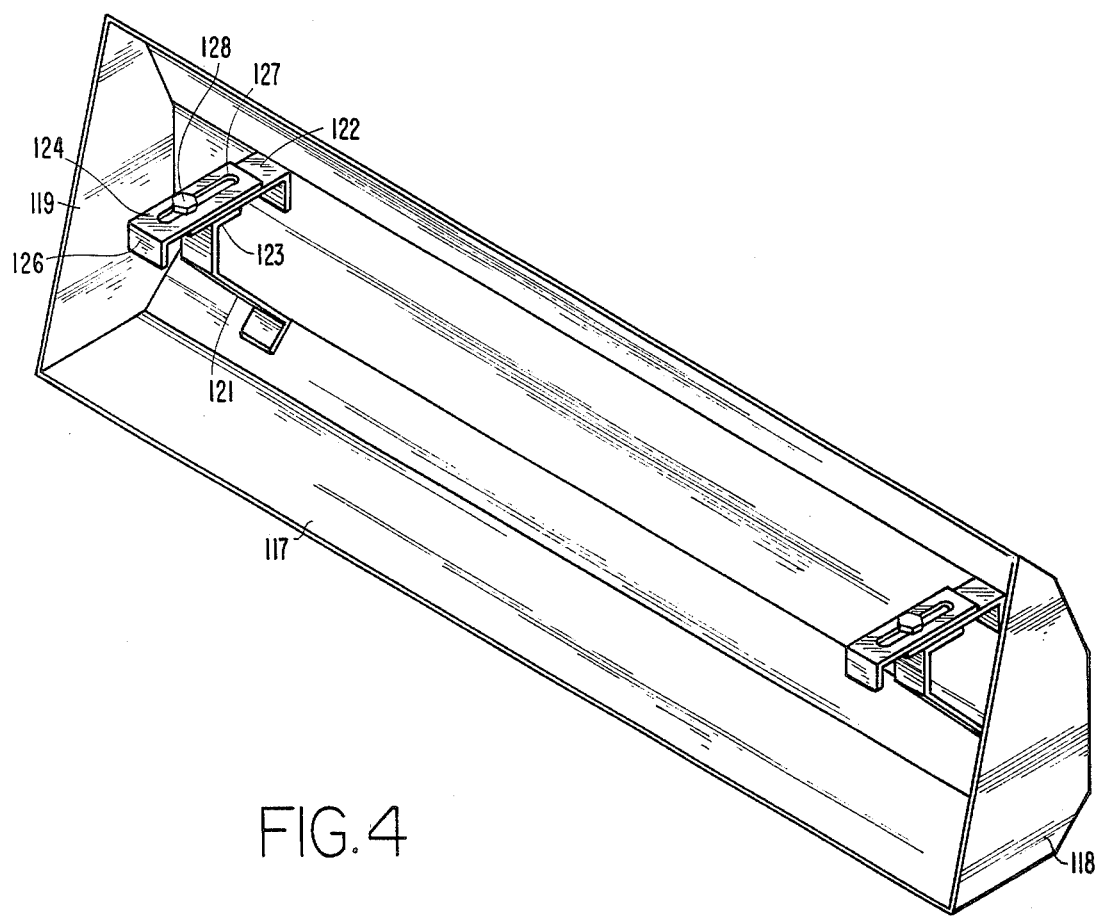
FIG. 4 is a pictorial view on a much enlarged scale of a flow re-director employed according to a typical embodiment of the present invention.

According to another feature of the invention, smoke directors such as 114 and 116 are mounted at the outer ends of the conveyor supports 44 and 43, respectively. Each of these is the same as the other, so a description of one will suffice for both. The flow director 114 includes a shell 117 formed by multiple bends on a press brake and closed at the ends by walls 118 and 119 (FIG. 4). Two identical and horizontally spaced support brackets are employed. One of them includes the lower leg 121 and upper leg 122, fastened together at the flange 123. The other end of each of these legs being fastened to the shell. An arm 124 with a downturned flange 126 at its outer end has a slot 127 in the top, receiving the stem of the bolt 128, which is bolted into a "nutsert" fastened to the flange 123 of the bracket 121. The bracket is mounted to the end wall 44e (FIG. 1) of the conveyor support 44 and the tab 126 is hooked down on the inside of the top flange 44t at the top of the end wall 44e. The arm is movable longitudinally in view of the slot 127 to obtain a tight fit of the two brackets against the end of the support 44, whereupon the bolts 128 are tightened in position.

Although the shell is shown as a multi-formed piece, with 30° "kicks" at each of the bends to establish the generally curved concave surface of the shell, it could also be roll-formed. The shell provides a lower edge 131 spaced below the bottom of the upper conveyor support and slightly outboard therefrom as shown best in FIG. 1. The upper edge 132 is located one to two inches above the top of the conveyor support and upper flight of conveyor chain, and is spaced horizontally outboard therefrom. The direction of the shell surface at upper edge 132, such as shown by tangent line 133 in FIG. 2, is directed upward and inward over the upper conveyor chain toward the oven assembly. In this way, heat and fumes which may rise from the products on the lower conveyor at the portion outside the oven chamber opening 33r, as well as any heat escaping from the baking chamber through the opening 33r and which rises and is deflected outward by the upper conveyor end support 44, will be captured in the outboard flow director 114 and re-directed inward toward the oven assembly, in the direction of the arrow 134, and can be captured in the end drop 76. Thus, the director 114 can be referred to as a flow re-director. The same technique is used with the flow re-director 116.

The amount of smoke and fumes and hot air issuing from the cooking chamber 33 at each end, may depend largely upon which way the conveyor is moving. However, since these ovens are typically of the type which apply streams of hot air directly to the food product passing through them, it is quite possible for hot air and fumes to exit the openings at both ends, and which are essentially identical to each other. Accordingly, the hood assembly in combination with the flow redirectors and ovens according to the illustrated typical embodiment of the present invention, are well adapted to handling all of the heat and smoke which may be generated in such ovens.

Finally, in order that any smoke generated by such ovens is properly filtered, filters as at 136 can be incorporated in each of the side drops, the filters being standard filters and supported on the upper filter rack 137 secured to the hood top 57, lower filter rack and grease trough 138 secured to the intermediate wall 62, and such mullions (not shown), if any, as may be needed to close the space between the side edges of the filters and the hood front and rear walls.

Because of the fact that the upper oven control compartment is wholly covered by the hood, and the sides are partially covered by the intermediate walls 61 and 62 of the hood, these walls 61 and 62 may have replaceable panels in them and which can be removed for access through the hood side drops to the control compartment 29.

In a typical example of the invention as described above, where each of the ovens has a 135,000 BTU per hour input, the blower can effectively handle the heat and smoke load if it can handle 1275 cubic feet of air per minute. Of that amount, 350 cubic feet per minute is taken from the bonnet, and the rest of it is taken from the chamber 86 above the central barrier in the hood. Therefore, since the oven manufacturer typically recommends an exhaust capacity of 80 cubic feet per minute for the exhaust for each oven, there is more than adequate capacity to handle the combustion products from the gas fired ovens. To provide rigidity, and minimize risk of injury during installation of the hood, the lower marginal edges of the hood itself are hemmed. To minimize the induction of room air horizontally under the edges of the hood, it is desirable that the slots be about 1.5 to 2.5 inches above the lower edge of the hood. So the plates are positioned with the bottom of their outer slot-bordering margins at about this height above the hood outer wall bottom edges. Consequently, the air being exhausted and which accelerates to pass through the slots, is primarily that which has passed upward around and through the ovens and the conveyors.

The invention has been described in combination with the Middleby Marshall double oven. It can also be employed with ovens of other manufacturers. In some instance, the design of the oven enables elimination of drops at each side of the hood. For example with ovens by Lincoln Mfg. Co. of Fort Wayne, Ind. the hood can extend out over the conveyor supports, but the end portions do not project down below the bottom of the central portion.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. An exhaust system comprising:
  a hood including front, rear, top, and end walls for mounting over and covering the horizontal area occupied by a conveyorized cooking oven;
  a pair of vertically extending intermediate walls in the space between said end walls, and extending part of the distance from the top to the bottom of said front wall;
  first barrier means spaced below said top wall, located between said intermediate walls, and substantially closing an opening defined by said front, rear and intermediate walls, said first barrier means having margins proximate said front and intermediate walls to thereby provide a communication slot for communication from the space under the hood where the oven is to be located to the space in the hood above said first barrier means;
  second and third generally horizontal barrier means located between the end walls and intermediate walls, each of said second and third barrier means having a margin adjacent one of said end walls and a portion of the said front wall, thereby providing communication slots between the space below the hood and the space in the hood above the second and third barrier means; and outlet means in said hood above said first barrier means to remove air from the space in the hood above said first, second and third barrier means.

2. The system of claim 1 and further comprising:
a bonnet projecting outward from the rear wall for collection of flue gas from the oven;
an exhaust stack connected to and extending out from said hood outlet;
a flue stack extending from said bonnet upward and latterally into said exhaust stack; and
exhaust blower means connected to said exhaust stack for pulling air from the hood and exhausting the air outside a building.

3. The system of claim 1 wherein:
said first barrier means is attached to the inside of said hood rear wall and thereby has a peninsular relationship to the rear wall and cooperates with said front wall and said intermediate walls to provide a generally U-shaped slot for communication between the space outside the hood under said first barrier means and the space inside the hood above said first barrier means.

4. The system of claim 1 wherein:
said second and third barrier means are generally horizontal but extend upward from the horizontal toward said intermediate walls at angles of about 9°.

5. The system of claim 1 wherein:
said second and third barrier means are located at a lower elevation than is said first barrier means.

6. The system of claim 1 wherein:
the front and rear walls at locations between said end walls and intermediate walls extend down beyond the portion of said front wall proximate said first barrier means, such that said hood is adapted to overhang the left and right sides of an oven under it and have depending end portions extending down beside both sides of the oven toward food conveyors extending from the sides of the oven whereby the hood is adapted to receive air rising above the extending conveyors of said oven and air rising above a central portion of the oven.

7. The system of claim 6 and wherein:
said intermediate walls include removable panels for access from the said depending end portions to oven portions disposed under the hood between the said depending end portions of the hood.

8. The system of claim 1 and wherein:
said second and third barrier means are attached to and extend forward from said rear wall, with one side and end margin of each of said second and third barrier means being proximate the respective end and front wall portions facing them to provide generally L-shaped communication slots between the space below and the space in the hood above said second and third barrier means.

9. The system of claim 8 and further comprising an exhaust air mover having an intake coupled to said hood outlet means, and wherein:
the width of each leg of the L-shaped slot is approximately two inches at the short leg of the L and about 2¼ inches at the long leg of the L, and the capacity of the exhaust air mover is such that air pulled from the room through the hood by the exhaust blower accelerates at the location of the slots.

10. The system of claim 1 and wherein:
said barrier means are attached to the rear wall of said hood; and
hangers are provided between the top wall and frontal portions of said barrier means to suspend the frontal portions of said barrier means in the hood.

11. The system of claim 10 wherein:
the attachments of said second and third barrier means to said rear wall are in generally horizontally spaced locations, the rear margin of said second and third barrier means between the locations of attachment to the rear wall being spaced from the rear wall to provide slots at the rear of said second and third barrier means communicating from the space below said second and third barrier means to the space in the hood above said second and third barrier means.

12. The system of claim 11 wherein:
the width of the slots between the rear wall of the hood and that portion of the rear margin between the points of attachment of the second and third barrier means to the rear wall is about two inches.

13. The system of claim 3 and wherein:
the spacing between the margin of said first barrier means and the front and intermediate walls is such that the width of the branches of the U-shaped slot is about two inches.

14. The system of claim 13 and wherein:
said outlet is substantially square and is about ten inches on each side.

15. The system of claim 14 wherein:
said first barrier means has an eight inch diameter hole centrally located therein.

16. The system of claim 15 wherein:
the front wall has a height of about 7½ inches between said intermediate walls and a height of about 18 and ¾ inches outboard of said intermediate walls, and the back wall has a height of about six inches between said intermediate walls and a height of about 18 and ¾ inches outboard of said intermediate walls.

17. The system of claim 16 wherein:
the inner margin of each of said second and third barrier means is spaced from the intermediate wall which it faces a distance of about 5¾ inches to provide a slot of that width between said second and third barrier means and the respective intermediate walls faced by said second and third barrier means.

18. In a building having a room therein with a ceiling and roof over it, and exhaust blower means outside the building, a cooking and ventilation system comprising:
a cooking unit having a heating station and conveyor means extending out beyond an end of the heating station; and
a hood having an outlet coupled to the exhaust blower means and having a central portion covering the heating station and an end portion covering said conveyor means;
the cooking unit including a housing enclosing said heating station and having left-hand and right-hand sides;
the conveyor means including a first conveyor support outside one of said sides of the housing, and a conveyor extending from said support into said housing; and
air flow director means mounted to the conveyor support at the outer end of the support, the director means having a lower edge below the level of the bottom of said support and an upper edge spaced from the end of the conveyor, said director means being shaped to intercept air flowing outward under said support, and to redirect the air around the end of the support toward the housing.

19. The system of claim 18 and further comprising:
a second cooking unit having a second heating station below the first heating station;
a second conveyor support outside the opposite one of said housing sides;
a second conveyor extending under said first conveyor support from said second heating station; and wherein
the first mentioned conveyor extends into the housing from said second support;
said second conveyor extends under said second support from said second heating station; and
second air flow director means are mounted to said second support at the outer end of said second support, said second director means having a lower edge below the level of the bottom of said second support and shaped to intercept air flowing outward under said second support and redirect the air around the end of the second support toward the housing.

20. The system of claim 19 wherein:
said hood has a second end portion covering said conveyor means.

21. The system of claim 20 wherein:
the cooking equipment includes a control compartment above said housing; and
said hood end portions are drops extending at least partway down the sides of said compartment.

22. In a building having a room therein with a ceiling and roof over it, and exhaust blower means outside the building, a cooking and ventilation system comprising:
a cooking unit having a heating station and conveyor means extending out beyond an end of the heating station; and
a hood having an outlet coupled to the exhaust blower means and having a central portion covering the heating station and an end portion covering said conveyor means;
said cooking unit including a housing enclosing said heating station and having left-hand and right-hand sides;
said conveyor means including a first conveyor support outside one of said sides of said housing, and a conveyor extending from said support into said housing;
the system further comprising:
air flow director means mounted to the conveyor support at the outer end of the support, the director means having a lower edge below the level of the bottom of said support and being shaped to intercept air flowing outward under said support, and to redirect the air around the end of the support toward the housing;
a second cooking unit having a second heating station below the first heating station; and
a second conveyor extending under said first conveyor support from said second heating station; and
said flow director means having a semi-circular configuration extending from said lower edge below the level of the first conveyor support outward and upward and back toward the portion of the housing above the first mentioned conveyor for deflecting hot air rising from said second conveyor back toward the housing and the conveyor covering portion of said hood.

23. A heat and fume collector system for a conveyorized oven wherein the oven includes a generally rectangular box having a front and side walls and conveyor means extending out openings in both side walls, the system comprising:
a hood including a central portion covering the box of the oven; and the hood including end portions covering the extending conveyor means; and
a pair of generally semi-cylindrical air flow guide members mounted at opposite ends of the conveyor means at opposite sides of the oven and directing hot air from below the conveyor means and around the conveyor means ends and then up and back toward the sides of the box; and
a hood exhaust outlet in the hood.

24. The system of claim 23 and further comprising:
a combustion product collector bonnet behind the hood and having an outlet connected into an exhaust duct.

25. The system of claim 24 and wherein:
the end portions of the hood drop to a level below the central portion, to be closer to the conveyor means.

* * * * *